United States Patent [19]

McCanny et al.

[11] Patent Number: 4,833,635

[45] Date of Patent: May 23, 1989

[54] BIT-SLICE DIGITAL PROCESSOR FOR CORRELATION AND CONVOLUTION

[75] Inventors: John V. McCanny, County Down, Ireland; Richard A. Evans, Herefordshire; John G. McWhirter, Worcestershire, both of England

[73] Assignee: The Secretary of State for Defence in Her Britannic Majesty's Government of the United Kingdom of Great Britain and Northern Ireland, London, England

[21] Appl. No.: 22,309

[22] Filed: Mar. 5, 1987

[30] Foreign Application Priority Data

Mar. 5, 1986 [GB] United Kingdom ............... 8605367

[51] Int. Cl.$^4$ ............................................. G06F 7/38
[52] U.S. Cl. ......................... 364/728.01; 364/728.04; 364/749
[58] Field of Search ............... 364/728, 749, 768, 754, 364/736

[56] References Cited

U.S. PATENT DOCUMENTS

| | | | |
|---|---|---|---|
| 4,493,048 | 1/1985 | Kung et al. | 364/728 |
| 4,533,993 | 8/1985 | McCanny et al. | 364/200 |
| 4,639,857 | 1/1987 | McCanny et al. | 364/754 |
| 4,686,645 | 8/1987 | McCanny et al. | 364/754 |
| 4,701,876 | 10/1987 | McCanny et al. | 364/728 |

OTHER PUBLICATIONS

Urquhart, R. B. et al., "Efficient Bit-Level Systolic . . . " 645 G.E.C. Journal of Research 2(1984) No. 1, Rugby, Great Britain, pp. 52–55.

Primary Examiner—Gary V. Harkcom
Assistant Examiner—Long T. Nguyen
Attorney, Agent, or Firm—Nixon & Vanderhye

[57] ABSTRACT

A bit-slice digital processor for performing an N-point correlation or convolution of N single-bit coefficients with a bit parallel, word serial, bit-staggered stream of M bit data words. The processor includes an N row, M column array of one-bit gated full adders with rows extended by half adders to accommodate word growth. Intercell connections incorporating clock activated latches provide for data and result flow unidirectionally down columns, one at twice the rate of the other. Carries and coefficients move unidirectionally along array rows at the faster (data or result) rate. Complex computations are executed by arrays of processors each with output delaying means and an adder to sum separate processor contributions. The processor may include data and result bypass connections subdivided by clocked latches for bypassing without operating speed penalties, as required for fault-tolerant processor array construction.

8 Claims, 7 Drawing Sheets

BIT-SLICE DIGITAL PROCESSOR FOR CORRELATION AND CONVOLUTION

This invention relates to a bit-slice digital processor for performing the mathematically equivalent convolution and correlation operations, the processor being of the kind implemented as a bit-level systolic array.

BACKGROUND OF THE INVENTION

Known digital processors for convolution and correlation implemented as bit-level systolic arrays are described in British Patent Application No. 2106287A published on 7th of April, 1983 (Reference 1), in which FIGS. 15 to 20 refer to a convolver. Equivalent U.S. Pat. Nos. are U.S. Pat. Nos. 48533,993 and 4,639,857. This device consists of a rectangular array of gated full adder logic cells arranged in rows and columns. Each cell is connected to its immediate row and column neighbours only, ie each cell is connected to a maximum of four other cells. Cell operation is controlled by clocked latches which effect movement of data, coefficient, carry and sum bits through the array. Each cell evaluates the product of an input data bit and an input coefficient bit received from left and right hand neighbours respectively, and adds the product to input carry and cumulative sum bits received from the right and above respectively. New carry and cumulative sum bits are generated for output to the left and below, and the input data and coefficient bits pass to the right and left respectively. Each coefficient word is circulated bit serially through a respective array row. Each data word passes through each row in succession and in effect spirals (strictly speaking zig-zags) up the array. Successive carries move with coefficient bits, and successive cumulative sums move down array columns. Data moves in counterflow with respect to both cumulative sum generation and coefficient and carry propagation. Cumulative sum generation is cascaded down array columns to produce partial sums output from the array. Partial sums of like bit significance emerge from the same array column in succession, and are accumulated to form convolution results by full adders arranged for output sum feedback.

It is a disadvantage to the use of processors described in Reference 1 that data and coefficient words must be interspersed with zero bits to avoid generation of unwanted partial products. At any time, at least half and in one case three quarters of the array cells compute zero partial products. The array is therefore inefficient, and much larger than would be required if interspersed zero bits could be avoided.

A further bit-level systolic array is described in British Patent Application No. 2144245A published 27, Feb. 1985 (Reference 2). The equivalent U.S. Pat. No. is 4,686,645. This relates to an array similar to that of Reference 1 for multiplying two matrices having multi-bit coefficients. This provides for row elements of one matrix to propagate along array rows in counterflow with column elements of the other, carry bits being recirculated on each cell rather than moving along rows. The use of so-called "guard bands" is described, this being the extension of coefficient words with zero bits to provide for word growth of accumulating results.

British Patent Application No. 2147721A published May 15, 1985 (Reference 3) relates to a further bit-level systolic array for matrix-vector multiplication. The equivalent U.S. Pat. No. is 4,701,876. Improved array efficiency is obtained in two ways. Firstly, array output accumulation is arranged such that parts of the array corresponding to inactive regions in Reference 1 contribute to convolution results. Secondly, the need for zeros between data and coefficient bits is avoided by complex clocking arrangements effecting bit movement in adjacent rows on alternate clock cycles. As in References 1 and 2, multiplicand bits move in counterflow in array rows. As in Reference 2, carry bits are recirculated on each cell and word extension with guard bands is employed.

In the GEC Journal of Research, Vol. 2, No. 1, 1984, R. B. Urquhart and D. Wood introduce the concept of using static coefficients in bit-level systolic arrays. Each cell of an array is associated with a respective single bit of a coefficient, and a coefficient word is associated with a corresponding array row. The cells are arranged for carry bit recirculation, data is input to each array row and moves along it. Cumulative sum generation is cascaded down array columns and guard bands provide for word growth. Partial sums of like bit significance emerge from different array columns either with relative delays or synchronously according to whether input data meets coefficient bits in ascending or reverse order of bit significance. This arrangement provides 100% cell utilisation or array efficiency without requiring complex clocking arrangements.

Each cell computes products on every clock cycle, and all latches are clocked in the same way. Unfortunately, however, array accumulation as described cannot provide correct convolution or correlation results, since the scheme proposed would produce wrongful accumulation of partial sums and carry bits corresponding to different results.

In the art of digital arithmetic circuits, it is important to provide for standardisation of components if at all possible. This is greatly facilitated if integrated circuits designed for small calculations can be linked together or cascaded in an array to perform a much larger calculation. It is also important, although very rarely achievable, to provide for some degree of fault tolerance in such an array of integrated circuits, in order that a comparatively small fault might not render the array entirely useless. This is of particular importance in the developing field of wafer scale integration, in which wafer yields can be virtually zero without some degree of fault tolerance. It is an object of the present invention to provide a digital processor for correlation or convolution capable of being cascaded to form a fault tolerant assembly.

SUMMARY OF THE INVENTION

The present invention provides a bit-slice digital processor for executing a correlation or convolution operation of N single bit coefficients with a bit parallel, word serial, bit staggered data stream of M bit words, and wherein:

(1) the processor includes an array of N rows and M columns of logic cells;
(2) each logic cell is arranged to:
   (a) input data, carry and cumulative sum bits,
   (b) output the data bit, and
   (c) produce output cumulative sum and carry bits corresponding to addition of the input cumulative sum and carry bits to the product of the input data bit with a coefficient bit associated with a respective row of cells;

(3) cell interconnection lines are arranged to provide for carry bit propagation along array rows and for data flow and cascaded cumulative sum generation to proceed unidirectionally down array columns; and (4) the cell interconnection lines include clock activated delaying means arranged to provide for data bits to move down array columns at either twice or half the rate of cumulative sum bit movement, and for carry bits to move along array rows at the rate of the faster of these in the direction of increasing data bit significance.

For the purposes of this specification, the expression "rate of bit movement" and references to it are construed as the rate of traversal of cells, as opposed to that of physical distance.

The processor of the invention provides four major advantages. Firstly, it is 100% efficient in that all cells operate on real data when clock activated, and only a simple two phase non-overlapping clock of known kind is required. Unlike the prior art of Reference 1, there is no requirement for input data bits to be interspersed with zero bits, nor for complex clocking arrangements for bit movement in adjacent rows or columns on alternate cycles as in Reference 2. Secondly, as will be described, it is easily adaptable to provide an integrated circuit building block for constructing arrays of such circuits to carry out larger computations. In particular, computations involving multi-bit coefficients may be accommodated by providing one processor per coefficient bit-slice and summing the processor outputs with appropriate timing and bit significance adjustment. Moreover, larger coefficient sets may be accommodated by processors cascaded in series, and long data words may be processed by division into individual bytes fed to respective processors. Thirdly, by virtue of its provision for unidirectional data and result flow, the invention permits a design of processor incorporating input data and result bypass connections subdivided by clock activated latches into rapidly switchable sections. A cascaded series chain of such processors has fault tolerant properties without the penalty of reduced operating speed, since a faulty processor in the chain may be bypassed without operating speed being limited by the time constant of the whole bypass connection length. Such a design is not possible with the Reference 1 processor for example, in which data and results move in counterflow and clock activated bypass latches would disrupt computation timing. Fourthly, there is no necessity for guard band extension of input data and its penalty of reduction in data throughput rate.

Each logic cell may be associated with a respective stationary coefficient bit. Preferably however additional cell interconnection lines and clock activated delaying means are arranged to provide for coefficient bits to move along respective array rows in the same direction and at the same rate as carry bits. This provides for ease of coefficient programming via row coefficient inputs. It is a further advantage of the invention in this embodiment that coefficient programming is obtainable while retaining 100% cell utilisation. Reference 3 for example requires stationary coefficients to achieve 100% efficiency.

The processor of the invention may include programmable delaying means via which array output is routed to first inputs of a multi-bit full adder. The adder has second inputs arranged to receive output from a second processor, and has outputs arranged for connection to second inputs of an equivalent adder of a third processor. In this form the processor is suitable for use as a building block in constructing processor arrays for computations involving long data words or coefficient sets, or for multibit coefficients. The programmable delaying means is employed to adjust the relative timing of output from different processors, and differences in output bit significance between processors are accommodated by appropriate adder input connections.

The processor may be employed with all positive or two's complement data and coefficients with provision for sign bit extension where appropriate. However, it is necessary that the processor operate with data which do not produce carry bits which cannot be accommodated within array rows. In other words, word growth in result accumulation must not exceed array size. If necessary, array size may be increased to accommodate word growth by extending array rows with half adders, the nth row including either $\log_2 n$ half adders ($n=1,2...$) or $\log_2(n-1)$ adders ($n=2,3...$) with a connection including delaying means between the carry output of the $(n-1)$th row and the sum input of an appropriate nth row half adder.

BRIEF DESCRIPTION OF THE DRAWINGS

In order that the invention might be more fully understood, embodiments thereof will now be described, with reference to the accompanying drawings, in which.

DETAILED DESCRIPTION OF THE INVENTION

Figure 1:
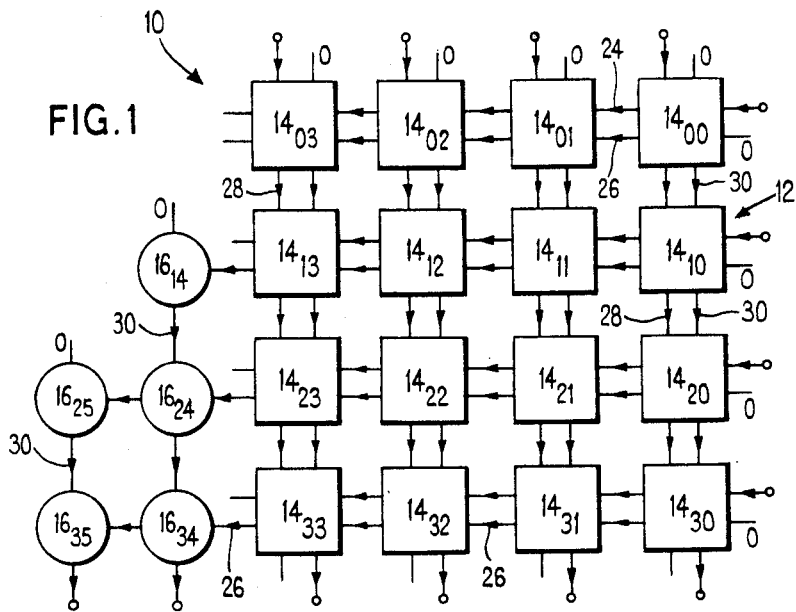
FIG. 1 schematically shows a processor of the invention arranged to perform correlation.

Referring to FIG. 1, there is shown a bit-slice processor 10 of the invention. The processor 10 will be described and analysed in terms of performance of the correlation function. It is however suitable for the mathematically equivalent convolution operation, as will be described. The processor 10 is arranged to perform a correlation of four one-bit coefficients $a_i$ ($i=0$ to 3) with a data stream of successive four-bit numbers $X_n$ ($n=0,1,2,...$) having individual bits $x_n^b$ ($b=0$ to 3). For the purposes of this example, the data and coefficients will be taken to be positive.

The processor 10 includes an array 12 of gated full adder logic cells 14 arranged in four rows and four columns. Each cell is referenced generally as 14, but as illustrated each reference has indices indicating row and column position; ie cell $14_{ij}$ is the jth cell in the ith row. The processor also includes five half adder logic cells 16 each with similar row and column indices relating to position.

Figure 2:
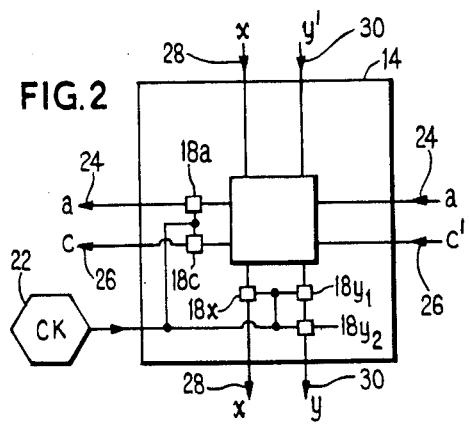
FIGS. 2 and 3 respectively show gated full adder and half adder cells of the FIG. 1 processor in more detail.
Figure 3:
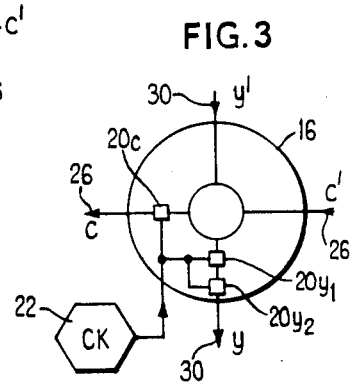

Referring now also to FIGS. 2 and 3, each logic cell 14 is arranged to carry out the gated full adder logic function as follows:

$$y \leftarrow y' \oplus (a.x) \oplus c' \qquad (1.1)$$

$$c \leftarrow y'.c' + y'(a.x) + c'(a.x) \qquad (1.2)$$

where:
y' and y are respectively input and output cumulative sum bits,
c' and c are respectively input and output carry bits,
a is an input one-bit coefficient,
x is an input data bit.
indices relating to bit significance and word number being omitted for clarity.

Each logic cell 14 is arranged to receive an input data bit x and an input cumulative sum bit y' from a neighbouring cell immediately above. In addition, it is arranged to receive an input coefficient bit a and an input carry bit c from a neighbouring cell immediately to its right. It performs the Equation (1.1) and (1.2) logic function to produce output cumulative sum and carry bits y and c. These output bits correspond to addition of c' and y' to the product of a and x. Carry and coefficient output bits a and c are output via respective clock activated latches 18a and 18c to an immediate left hand neighbour. Data and cumulative sum output bits x and y pass to a single clock activated latch 18x in the case of x and via two clock activated latches $18y_1$ and $18y_2$ in the case of y.

As shown in FIG. 3, each half adder cell 16 receives carry and cumulative sum input bits c' and y' from neighbouring cells to its right and above. It adds these to produce output carry and cumulative sum bits c and y to be passed via clock-activated latches 20c, $20y_1$ and $20y_2$ to neighbouring cells to the left and below. The half adder cells 16 execute the logic function:

$$y \leftarrow y' \oplus c' \qquad (2.1)$$

$$c \leftarrow y'.c' \qquad (2.2)$$

where terms are as previously defined.

Figure 10:
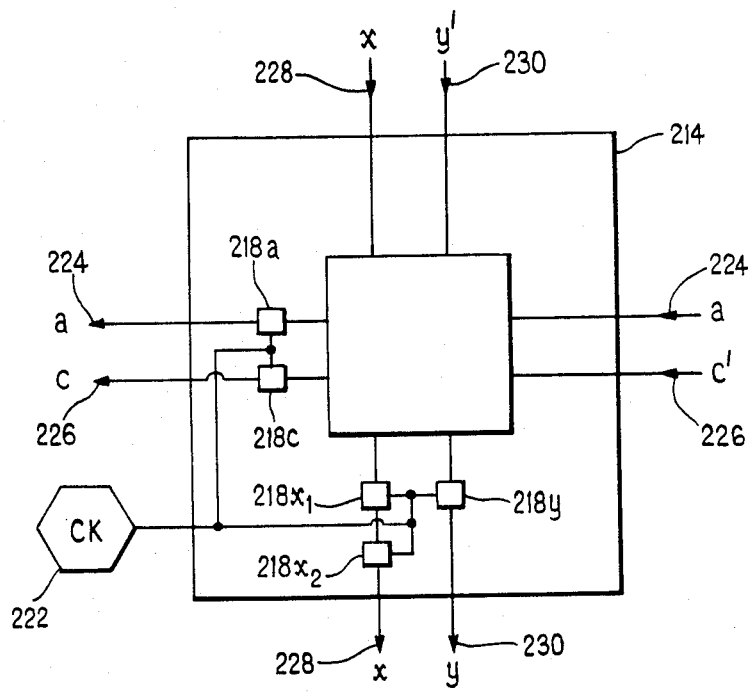
FIG. 10 illustrates an alternative form of gated full adder cell for use in the FIG. 1 processor.

Each of the latches 18 and 20 is activated by a single clock 22 (not shown in FIG. 1) which clocks all cells 14 and half-adders 16 of the array 12. The clock 22 produces a two-phase, non-overlapping clock signal, and each latch 18 or 20 consists of two half-latches in series. On a first phase clock pulse, each second half latch outputs a latched bit and each first half latch inputs a new latched bit. On a second phase clock pulse, each first half latch transfers its latched bit to the respective second half latch. On successive clock cycles therefore, successive bits are clocked through each latch. Whereas the cells 14 and 16 have full latches such as 18a on respective cell outputs, these could be located on cell inputs or divided into respective input and output half latches without affecting array operation. It is also known to employ a respective half latch instead of each full latch, which provides an alternative to this embodiment. The operation of such latches is well known in the art of bit-level systolic arrays, and is illustrated in FIGS. 10 and 11 of Reference 1. It will therefore not be described further.

The effect of clocking the latches 18 and 20 is to move coefficient bits a and successively computed carry bits c along array rows through one cell per clock cycle, as indicated by arrows such as 24 and 26 respectively. The data bits x move through one cell per clock cycle. Coefficient and data bits pass unchanged through the array 12, whereas each newly computed carry bit becomes an input c' to a computation one level higher in bit significance carried out one clock cycle later by a respective left hand row neighbour 14 or 16.

Each newly computed output cumulative sum bit y becomes an input y' to a column neighbour 14 or 16 immediately below two clock cycles later, since each of these bits traverses two latches $18y_1$ and $18y_2$ or $20y_1$ and $20y_2$ as compared to one latch 18a, 18c, 18x or 20c for other bits.

The processor 10 includes only five logic cells $14_{12}$, $14_{11}$, $14_{22}$, $14_{21}$ and $16_{24}$ fully connected to four respective neighbours. Cells $14_{00}$ to $14_{03}$, $16_{14}$ and $16_{25}$ have y' inputs set to zero. Cells $14_{00}$ to $14_{30}$ have c' inputs set to zero. Cells $14_{03}$ to $14_{33}$ have unconnected coefficient or a outputs, and cells $14_{03}$, $16_{14}$, $16_{25}$ and $16_{35}$ have unconnected c outputs. Cells $14_{30}$ to $14_{33}$ have unconnected x outputs. First row cells $14_{00}$ to $14_{03}$ have x inputs to which data is fed into the processor 10 in a bit-parallel, word serial, bit-staggered manner to be described later. First column cells $14_{00}$ to $14_{30}$ have inputs 24 for input of coefficients indicated by the character a to the processor 10. Output from the processor 10 is obtained from the y outputs of last row cells $14_{30}$ to $16_{35}$.

In any practical implementation of the processor 10, redundant cell connections and corresponding latches could be omitted. However, it may be convenient for logic cells to be of as few types as possible. The processor 10 incorporates only two kinds of cell at the price of a minor degree of redundancy. This can be reduced to one kind of cell at the expense of further redundancy by replacing half adders 16 by gated full adders 14 having a and/or x inputs set to zero. A consequent advantage would be obtainable in for example simplifying integrated circuit production by computer aided design techniques. Moreover, as will be described, for two's complement arithmetic it is advantageous to construct rectangular arrays of gated full adder cells rather than to leave spaces such as to the upper left of the processor 10 in FIG. 1.

Operation of the processor 10 will now be described with reference to FIGS. 4, 5 and 6. The processor 10 is arranged to carry out the correlation operation defined by:

$$Y_n = \sum_{i=0}^{N-1} a_i X_{n+i} \ (n = 0, 1, 2, \ldots) \qquad (3)$$

where $y_n$ represents successive correlation result words, and coefficients $a_i$ and $X_{n+i}$ represents the general data word in the range $X_n$ to $X_{n+N-1}$.

Figure 4:
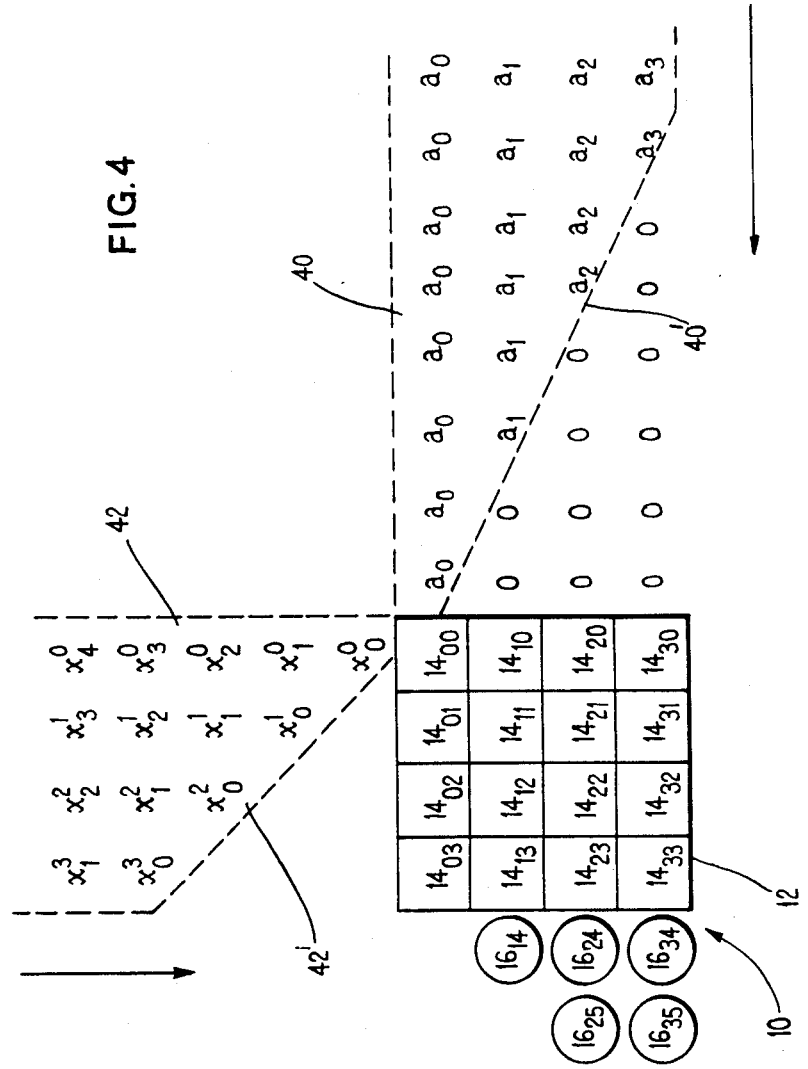
FIGS. 4, 5 and 6 illustrate data flow and result timing on respective clock cycles in the FIG. 1 processor.
Figure 5:
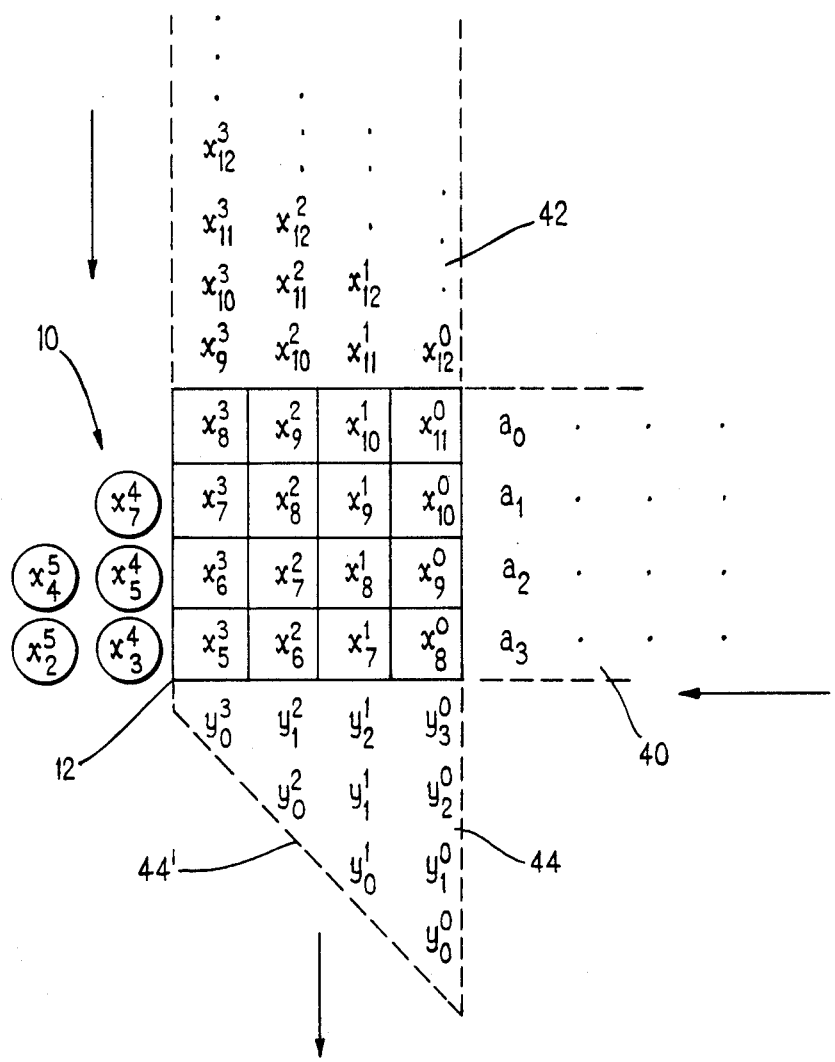
Figure 6:
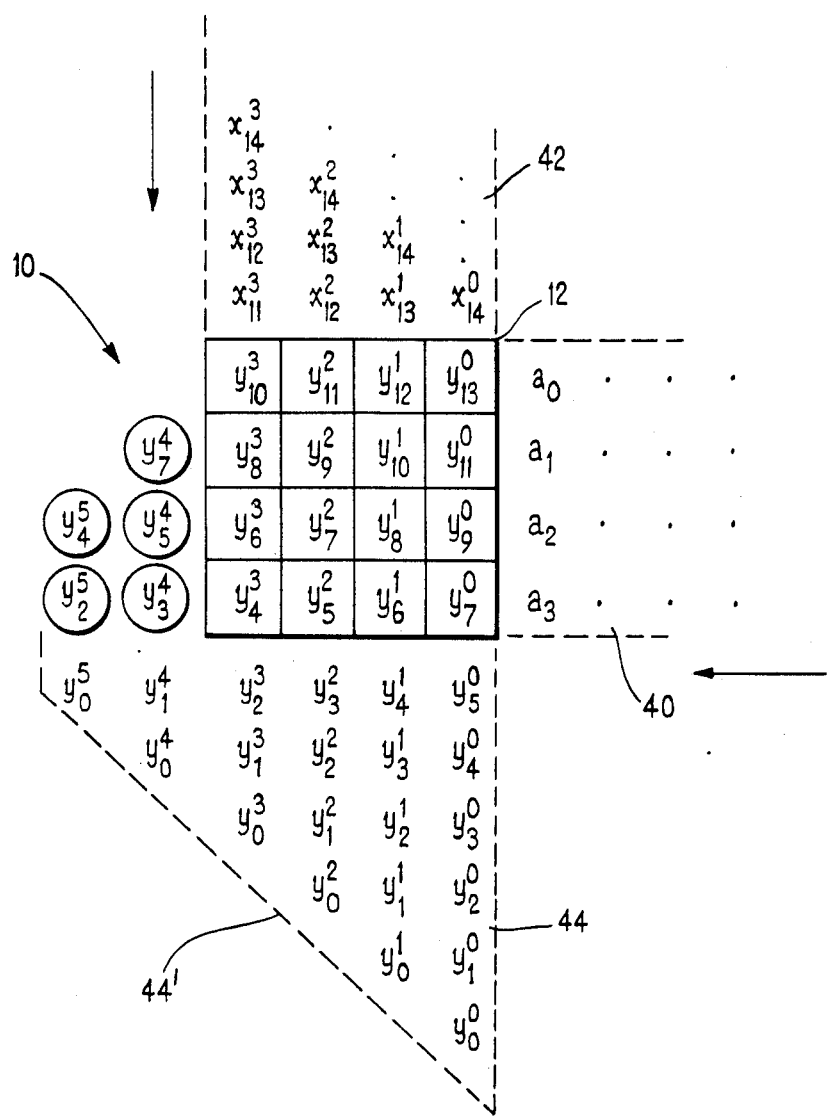

In FIGS. 4, 5 and 6, a stream 40 of single bit coefficient words $a_0$ to $a_3$ is shown moving to the left into the processor 10. Each coefficient is input to a respective correlator row. A data stream 42 is shown moving down into the processor 10, and a result stream 44 is emerging below it in FIG. 5 and 6. FIG. 4 illustrates the processor 10 immediately prior to the first clock cycle of operation, and FIGS. 5 and 6 show data and result bit locations on the eleventh and fourteenth cycles respectively. FIGS. 4 to 6 illustrate the timing of data and coefficient flow and result accumulation graphically.

Successive bit positions extending upwards or to the right of the processor 10 represent progressively later data input, result output or coefficient input. The diagonal leading edges 40', 42' and 44' of the coefficient, data and result streams 40 to 44 indicate time staggered bit input to the processor 10. Data words $X_{n+i}$ are input in a word-serial, bitparallel, cumulatively time staggered manner to the processor 10. Thus the bits $x_0^0$ to $x_0^3$ are input to first row cells $14_{00}$ to $14_{03}$ respectively with a one clock cycle delay between input to adjacent cells. Input of $x_0^n$ to cell $14_{0n}$ (n=1 to 3) accordingly lags input of $x_0^0$ to cell $14_{00}$ by n clock cycles.

By virtue of the Equation (1) logic function, one clock cycle after that illustrated in FIG. 4, clock cycle 1 say, cell $14_{00}$ receives input of $x_0^0$ and $a_0$. This cell consequently computes the product $a_0x_0^0$ and adds to it carry and sum input bits or c' and y' which are permanently zero. The corresponding cumulative sum or y output will therefore be $a_0x_0^0$, and the carry output c to cell $14_{01}$ will be zero. On clock cycles 3, 5 and 7, cells $14_{10}$ to $14_{30}$ will receive data inputs $x_1^0$, $x_2^0$ and $x_3^0$ and multiply them by $a_1$, $a_2$ and $a_3$ respectively. The corresponding carry inputs are all zero, but each cell $14_{n0}$ (n=1 to 3) receives as a cumulative sum input the cumulative sum output computed two cycles earlier by the respective cell $14_{(n-1)0}$ immediately above. The two cycle delay arises from respective latches $18y_1$ and $18y_2$. Cell $14_{10}$ accordingly receives $a_0x_0^0$ from cell $14_{00}$ on cycle 3 synchronously with input of multiplicands $a_1$ and $x_1^0$, and produces y and c outputs consisting of the least significant bit (lsb) and higher order bit (hob) of $(a_0x_0^0 + a_1x_1^0)$. The carry bit c passes to cell $14_{11}$ on cycle 4 and the cumulative sum output bit y passes to cell $14_{20}$ on cycle 5. Cell $14_{20}$ produces y and c as the lsb and hob respectively of $(a_0x_0^0+a_2x_2^0)$ on the cycle 5; c passes to cell $14_{21}$ on cycle 6 and y to cell $14_{30}$ on cycle 7, the latter synchronously with input of multiplicands $a_3$ and $x_3^0$. The y and c outputs of cell $14_{30}$ on cycle 7 are accordingly the lsb and hob of $[lsb(a_0x_0^0+a_1x_1^0+a_2x_2^0)+a_3x_3^0]$. The cumulative sum output of cell $14_{30}$ on cycle 7 may be expressed as:

$$y = lsb \sum_{i=0}^{3} a_i x_i^0 \quad (4)$$

Equation (4) is equivalent to:

$$y_0^0 = y_{n=0}^0 = lsb \sum_{i=0}^{3} a_i x_{n+i}^0 \text{ with } n = 0 \quad (5)$$

Equation (5) is the lsb of $Y_0$, the first correlation term in the series $Y_n$ (n=0,1,...) It is therefore demonstrated that the right hand column of cells $14_{00}$ to $14_{30}$ produces the lsb $y_0^0$ of $y_0$ seven clock cycles after that shown in FIG. 4. By virtue of there being two latches in series with its cumulative sum output, $y_0^0$ becomes available on latch $18y_2$ of cell $14_{30}$ eight clock cycles after that shown.

Turning now to second column cells $14_{01}$ to $14_{31}$, on cycle 2 cell $14_{01}$ receives zero c' and y' inputs together with $x_0^1$ and $a_0$ multiplicand inputs. It accordingly produces a zero carry output to cell $14_{02}$ to its left and a y output of $a_0x_0^1$ to cell $14_{11}$ below. On cycles 4, 6 and 8, cells $14_{11}$, $14_{21}$ and $14_{31}$ receive $a_1/x_1^1$, $a_2/x_2^1$ and $a_3/x_3^1$ respectively. The y output on second latch $18y_2$ of cell $14_{31}$ on cycle 9 is accordingly given by:

$$y_0^1 = lsb \left[ (a_0x_0^1 + a_1x_1^1 + a_2x_2^1 + a_3x_3^1) + \text{carry bits from } \sum_{i=0}^{3} a_i x_i^0 \right] \quad (6)$$

$$\text{ie } y_0^1 = lsb \left[ \sum_{i=0}^{3} a_i x_i^1 + \text{carry bits from } \sum_{i=0}^{3} a_i x_i^0 \right] \quad (7)$$

$y_0^1$ is the second lsb of $Y_0$, which accordingly emerges from the second column of cells $14_{01}$ to $14_{31}$ on cycle 9 or one clock cycle later than the lsb $y_0^0$ from the first column of cells.

Carry bits generated in the formation of $y_0^1$ pass to the third column of cells $14_{02}$ to $14_{32}$ as follows:

cycle 3, cell $14_{02}$ : c'=0      (8.1)

cycle 5, cell $14_{12}$ : c'=hob($a_0x_0^1$)      (8.2)

cycle 7, cell $14_{22}$ : c'=hob[lsb($a_0x_0^1+a_1x_1^1$)+$a_2x_2^1$]      (8.3)

cycle 9, cell $14_{32}$ :
c'=hob{lsb[lsb($a_0x_0^1+a_1x_1^1$)+$a_2x_2^1$]+$a_3x_3^1$}      (8.4)

By a similar analysis it can be shown that $y_0^2$ and $y_0^3$ emerge from the third and fourth columns of cells on cycles 10 and 11 respectively, with carry bits passing to the left as before.

The c' and y' inputs to first row cells are all permanently zero. The maximum value which can be produced by $a_0$ (equal to 1 to 0) multiplying any four bit number is the same number four bits in length. The c output of cell $14_{03}$ at the end of the first row is therefore always zero. The c output of cell $14_{13}$ at the end of the second row may be non-zero, since it results from the addition of two four bit numbers. Half adder cell $16_{14}$ is arranged to route this carry bit to the third array row. The third and fourth rows each require provision for two carry bits, since they respectively sum three and four four-bit numbers which can add to six bits. In general, the Nth correlator row (N=1, 2, 3, or 4) requires $\log_2 N$ half adders alongside it to sum laterally progressing carry bits, where $\log_2 N$ is rounded up to a whole number if necessary. The effect of this can be seen in FIG. 6, in which bits of significance 4 and 5, ie $y_n^4$ or $y_n^5$ (n=0,1,2 . . .) are seen as computed by the fifth and sixth columns respectively occupied by half adders. To minimise circuitry, half adders $16_{14}$ and $16_{25}$ could be replaced by simple clocked latches, since they merely provide a delay in the absence of input sum and output carry connections. In general, the Nth correlator row would then require $\log_2(N-1)$ half adders where N=2, 3 . . . The last two bits $y_0^4$ and $y_0^5$ emerge from the fourth and fifth column bottom row half adder cells $16_{34}$ and $16_{35}$ on cycles 12 and 13, the latter is illustrated in FIG. 6.

The foregoing analysis demonstrates that the bit of pth significance $y_0^p$ of $Y_0$ emerges from the pth column of cells on the (p+8)th cycle after that shown in FIG. 4, where p=0 to 5. This analysis is readily extendable to show that the pth bit $y_n^p$ of $y_n$ (the general correlation result) emerges from the pth column of cells on the $(n+p+8)$ cycle after that shown in FIG. 4. Accordingly, successive correlation results $Y_n$ emerge in a word-serial, bit-parallel fashion from the processor 10 with a latency of eight clock cycles; ie eight cycles are required for a result bit to emerge after input of a corresponding data bit.

The embodiment of the invention described with reference to FIGS. 1 to 6 relates to a processor employing moving single-bit coefficients. This is convenient where it is desirable to change the coefficients from time to time to implement different correlations. If however a fixed correlation was all that was required, each cell would have a respective stationary and perhaps pre-programmed coefficient. Intercell connections and latches for coefficient movement would then be unnecessary.

Referring to FIG. 4 once more, it will be apparent that output of correct computation results from the processor 10 is preceded by a small number of unwanted terms. In particular, cell $14_{30}$ will compute the product of $a_3$ and $x_0^0$ four cycles after that illustrated, which is a meaningless result. It is necessary to ignore results from cell $14_{30}$ for the first seven cycles of operation, from cell $14_{31}$ on the first eight cycles and so on. If necessary this could be achieved by means arranged to inhibit output for the appropriate number of cycles in each case. However, in practice, a processor 10 would be operated for a very large number of cycles, usually in excess of $10^6$.

An initial short series of a few meaningless results is therefore not significant in many millions. This merely corresponds to a circuit settling time well known in the art of digital arithmetic circuits.

As an alternative to ignoring initial results, and as illustrated in FIG. 4, coefficient input corresponding to unwanted terms may be set to zero. This requires 2n zeros preceding input of coefficient $a_n$ to the nth row of the processor 10, where n=0 to 3. In other words, the required number of zeros preceding coefficient input increases by two from row to row down the processor, no zeros being input to the first row. This also illustrates the means for changing between coefficient sets without introducing unwanted terms. To change from coefficients $a_0$ to $a_3$ to coefficients $b_0$ to $b_3$, input of $a_n$ to the nth row changes to $b_n$ two clock cycles after $a_{n-1}$ changes to $b_{n-1}$ in the (n−1)th row. This is shown in FIG. 4 for a change from zero coefficients to $a_0$ to $a_3$.

Figure 7:
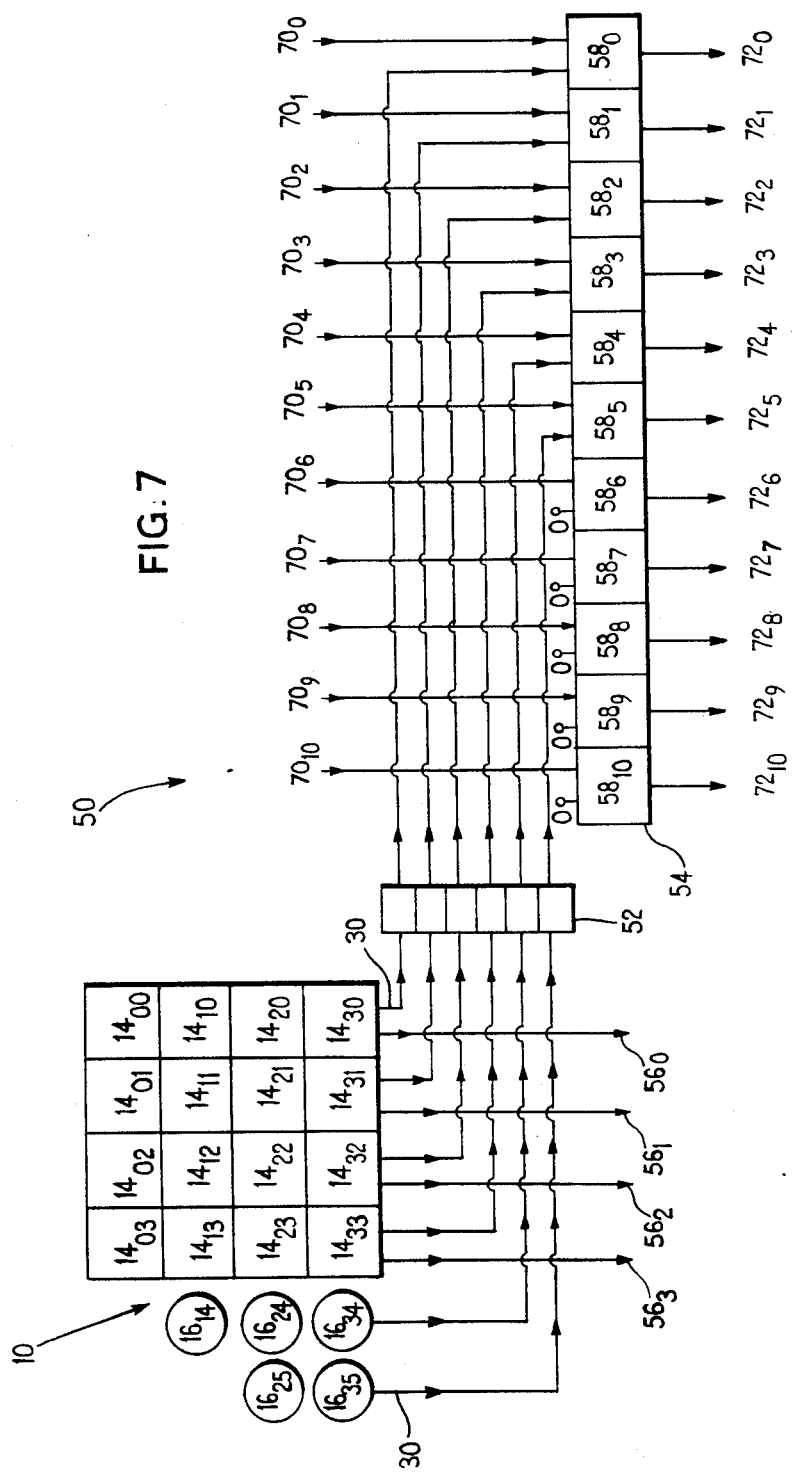
FIG. 7 schematically shows a processor of the invention which comprises that of FIG. 1 together with output delaying means and result accumulating means adapting it for use in constructing processor arrays for large computations.

Referring now to FIG. 7, in which parts previously described are like referenced, a further processor 50 of the invention is shown schematically. It incorporates the processor 10 with ancillaries adapting it for use in more complex computations. The bottom row cells $14_{30}$ to $16_{35}$ have cumulative sum outputs 30 connected via a programmable clock-activated delay unit 52 to an eleven bit clock-activated full adder 54. Bottom row data outputs 28 are connected to data output lines $56_0$ to $56_3$. The adder 54 has eleven individual one bit adder cells $58_0$ to $58_{10}$, one of which is shown in more detail in FIG. 8. Each adder cell 58 has first and second sum inputs 60a and 60b, carry input and output 62 and 64, and a sum output 66. The sum and carry inputs 60a, 60b and 62 are in series with clock activated one bit latches 68a, 68b and 68c respectively. Carry bits pass to the left along adder 54, ie from adder cell $58_n$ to adder cell $58_{n+1}$ (n=0 to 10). Adder cell $58_n$ receives and generates bits of nth significance, and has a first input 60a connected to receive output from array cell $14_{3n}$ (n=0 to 3) or $16_{3n}$ (n=4 or 5). Adder cells $58_6$ to $58_{10}$ have first inputs set to zero. The processor 10 accordingly provides the six least significant first inputs to the eleven bit adder 54.

The second inputs 60b of the adder cells $58_0$ to $58_{10}$ are connected to respective input lines $70_0$ to $70_{10}$. The adder outputs 66 are connected to respective output lines $72_0$ to $72_{10}$. The delay unit 52 is arranged to delay signals from each of the bottom row cells of the processor 10 by a like programmable number of clock cycles. The unit 52 may for example comprise a respective series arrangement of one bit clock activated latches for each output from the array, the number of latches in series being variable as appropriate to the required delay.

The processor 10, delay unit 52 and all latches of adder 54 are activated synchronously by the same two phase clock (not shown).

The processor 50 operates as follows. Correlation being an additive operation, it is possible to partition it into sub-computations for subsequent recombination provided that correct timing and bit significance is arranged. The delay unit 52 provides for correct timing and the eleven bit length of adder 54 for adjustment of bit significance, as will now be described for individual cases. The processor 50 is arranged for use with like processors all activated by the same two-phase clock.

If correlation involving twelve single bit coefficients $a_0$ to $a_{11}$ is required, three processors 50 are employed. Data is fed into the first processor and passes through it to the second via data output lines $56_0$ to $56_3$. The data stream is bit parallel, bit staggered and word serial as previously described. Similarly, data output from the second processor becomes input to the third. The first processor operates with coefficients $a_0$ to $a_3$, the second with coefficients $a_4$ to $a_7$ and the third with coefficients $a_8$ to $a_{11}$. The delay units 52 of the three processors are set so that output from the first processor experiences a fourteen clock cycle delay, that from the second a seven clock cycle delay and that from the third a zero delay. The second inputs 60b of the first processor adder 54 are all set to zero, and its output lines $72_0$ to $72_{10}$ are connected to the second inputs 60b of the second processor adder 54 via lines $70_0$ to $70_{10}$ respectively. Similarly, the output lines $72_0$ to $72_{10}$ of the second processor adder 54 are connected to the input lines $70_0$ to $70_{10}$ of the third processor adder, whose output lines furnish the required correlation result.

That this arrangement of three processors 50 furnishes the required twelve coefficient computation can be verified as follows. Referring to FIGS. 1 to 6 once more, the processor 10 requires eight clock cycles or two cycles per row to produce a result. A similar processor having twelve rows would require twenty-four cycles to produce a result. Partitioning the latter into three four-row processors receiving the same data sequentially means that the first processor produces a result after eight cycles, the second after sixteen cycles and the third after twenty-four cycles. There is therefore a relative delay of eight clock cycles between output from adjacent processors. Moreover, each eleven bit adder 54 takes one clock cycle to perform an addition by virtue of its clocked latches. The effect of the adder 54 is to reduce the relative delay by one clock cycle per stage. Each processor delay unit 52 is therefore required to provide a delay equal in number of clock cycles to the product of seven with the number of processors following it. The first and second processors therefore require their delay units to provide fourteen and seven clock cycle delays respectively. More generally, for a chain of N processors each with M rows, the nth processor delay unit would be set to a $(2M-1)(N-n)$ clock cycle delay, where $n=1$ to $N$.

For three processors 50 each providing a six bit output, the maximum value of their summed outputs is eight bits. This is three bits less than the width of an adder 54, so a much longer chain of processors can be accommodated.

Multi-bit coefficients may also be accommodated by a plurality of processors 50. For three bit coefficients for example, three processors 50 are employed. The first processor receives the msb (most significant bit) of each of the coefficient, the second processor the second 1sb and the third processor the 1sb. The coefficient set for each processor is therefore a respective bit slice of the multi-bit coefficient set. The data stream is fed synchronously to all three processors in parallel, as opposed to the previous serial arrangement of data flow. The third processor produces an output of bit significance 0 to 5, the second 1 to 6 and the first 2 to 7. This is because they are multiplying by coefficient bits of significance 0, 1 and 2 respectively. To correct for dissimilar bit significance, the first processor adder output lines $72_0$ to $72_9$ are connected respectively to adder input lines $70_1$ to $70_{10}$ of the second processor. First processor output line $72_{10}$ is left unconnected and second processor input line $70_0$ is connected to zero. Similar connections are made between the second processor adder outputs and the third processor adder inputs to implement an additional shift in bit significance. This provides for the outputs of the first and second processors to be shifted two steps and one step in bit significance with respect to that of the third. The result is that, for example, the output of the first or right hand column of cells of the first processor is added to that from the second and third columns of the second and third processors respectively. However, by inspection of FIG. 5 once more, there is a relative delay of one clock cycle between output from adjacent columns of a processor 10. Since data is fed synchronously to all three processors, a similar delay exists between for example the second column output of the second processor and the first column output of the first processor. Against this, the output of the first processor experiences a one cycle delay at its output adder 54, and the combined first and second processor outputs experience a further one cycle delay at the second processor adder. They are therefore both delayed as appropriate for correct timing of addition to the third processor output.

The delay units 52 of all three processors are accordingly set to zero delay.

The maximum value obtainable by adding together three numbers of six, seven and eight bits respectively is nine bits in length, which is easily accommodated within the eleven bits of third processor output adder.

It may also be required to employ data words more than four bits in width, whereas the processor 10 as described is suitable for four bit data only. Although a wider array could be employed, a number of processors 50 is also suitable. For eight bit data words, two processors 50 are employed. The four higher order bits are fed to the first processor and the four lower order bits to the second. The first processor adder output lines $72_0$ to $72_6$ are connected to the second processor adder input lines $70_4$ to $70_{10}$, first output lines $72_7$ to $72_{10}$ being unconnected and second input lines $70_0$ to $70_3$ being set to zero. This accomplishes the four step relative shift in bit significance. The adjustment for relative delay depends on the data input timing. If data is input with a one bit time stagger between adjacent bits across all eight bits, it is only necessary to adjust for the relative delay of one clock cycle introduced by the first processor adder. In this case the second processor delay unit 52 is set to provide a one cycle delay. If however the bit stagger is across only each four bit word portion, and input to both processors is synchronous, then the first processor output requires a four bit delay. This is implemented by setting the first processor delay unit 52 to provide a three cycle delay, and that of the second processor to zero. This also illustrates an alternative construction by an input data delay with equivalent effect in delaying output.

As an alternative to the use of delay unit 52, there may be provided a similar delay unit in series with the second inputs $70_0$ to $70_{10}$ of adder 54, or in series with the adder outputs $72_0$ to $72_{10}$. The number of clock cycle delays required will depend on delay unit location.

In this arrangement, the second processor provides an output of the sum of a ten bit and a six bit word, which has a maximum value of eleven bits. Thus in this example the full width of an output adder 54 is required. If it were necessary to carry out a computation involving data words 4N bits in width, a larger output adder (4N+3) bits wide would be necessary in at least the final processor. However, each individual logic cell array need only have the cells 14 and 16 shown in FIGS. 1 and 7. This illustrates the advantages of stage by stage accumulation with output adders such as 54. Each logic cell array need only be arranged to accommodate a limited amount of word growth, such as from four to six bits in processor 10. A much larger computation is acummulated separately by means of output adders.

It will be apparent from the foregoing description that increased data word length, multi-bit coefficients and increased correlation length can be implemented together by using appropriate numbers of processors such as 50. Strictly speaking, the first output adder 54 in a combination of processors 50 is unnecessary. However, in digital arithmetic circuit design it is convenient to standardise on one building block each in this case including an output adder.

Figure 8:
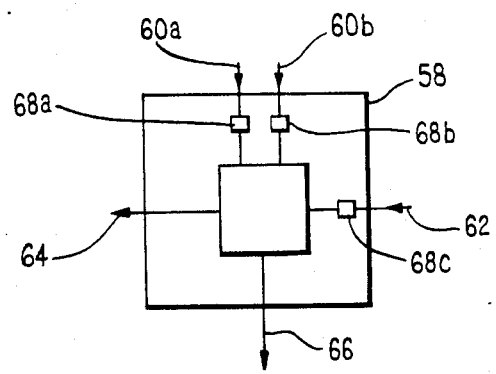
FIG. 8 shows in more detail a full adder cell of the kind employed in the FIG. 7 accumulating means.
Figure 9:
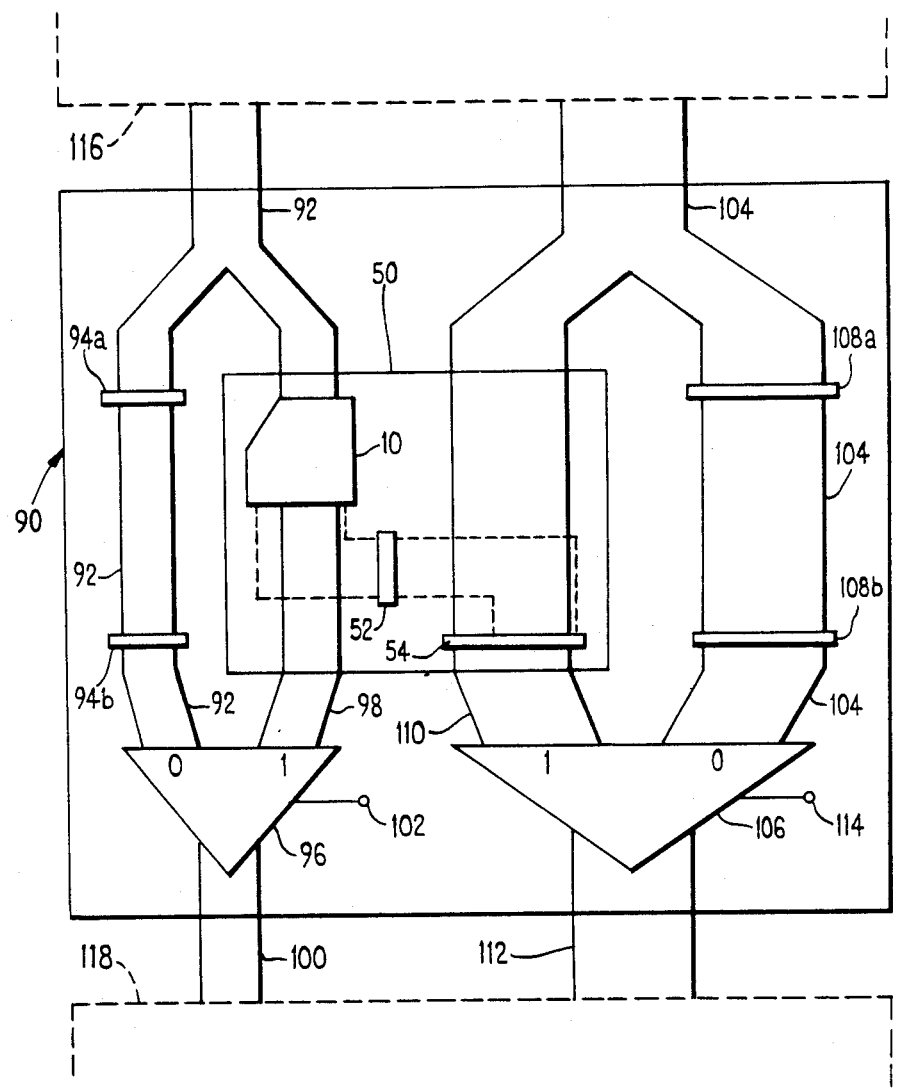
FIG. 9 schematically shows the FIG. 7 processor together with bypass connections as required for constructing fault tolerant processor arrays.

Referring now to FIG. 9, there is schematically shown a further processor 90 of the invention. It is equivalent to processor 50 of FIGS. 7 and 8 with the addition of bypassing means, and equivalent parts are like-referenced. Multiple line connections are shown as buses to avoid unnecessary complexity. The processor 90 contains a processor 50. An input data bus 92 is connected both to the processor 50 and via two banks of clock-activated delaying latches 94a and 94b to a first multiplexer 96. Data output from the processor 50 passes via a bus 98 to the multiplexer 96, which has a data output bus 100. The multiplexer 96 connects the output bus 100 to bus 92 or 98 according to whether the signal at its control intput 102 is 1 or 1.

A result input bus 104 is connected both to output adder 54 and to a second multiplexer 106 via two banks of clock activated delaying latches 108a and 108b. The second multiplexer 106 is also connected to an adder output bus 110 and to a result output bus 112. The result output bus 112 is connected either to the result input bus 104 or to the adder output bus 110 according to whether the signal at its control input 114 is 0 or 1.

The FIG. 9 processor 90 operates as follows. It is envisaged to be part of a chain of like processors, two adjacent processors being indicated by chain lines 116 and 118. In the event that processor 50 is fault-free, multiplexers 96 and 106 are furnished with logic 1 control input signals and the mode of operation is then as previously described. If however processor 50 is faulty, logic 0 control inputs are supplied to multiplexers 96 and 106, and input data and results bypass the processor 50 via latch banks 94a, 94b, 108a and 108b. Each latch bank provides a one cycle delay for each line of the corresponding bus. The individual latches (not shown) are equivalent to those described earlier, and are activated by the same clock used for the processor 50.

A faulty processor 50 is accordingly bypassed via latch banks introducing a delay of two clock cycles into both data and result flow. Data and result flow are therefore equally delayed and preserve synchronism previously imposed. Furthermore, and most importantly, the bypass buses are each divided into three comparatively short sections by the latch banks. If necessary, additional bypass latches could be inserted to subdivide further. The advantage of this is that each section of the bypass buses is sufficiently short to be switchable at least at the same clock frequency as the processor 50. The processor 50 may be constructed using state of the art integrated circuit technology, and may be operated at a very high clock frequency of 20 MHz or more. The ability to operate at a high clock frequency arises for example because the connections between logic cells 14 and 16 in FIG. 1 are only between adjacent cells. Necessarily however bypass buses are very much longer and have correspondingly much greater RC time constants. Such time constants would restrict the maximum clock frequency of a series chain of processors to an undesirably low value. Accordingly, if bypass bus subdivision into rapidly switchable sections were not employed, bypassing a faulty processor would result in a sudden fall in maximum clock frequency. If the reduction were to be to a frequency below that of the clock such as 22 in FIGS. 2 and 3, the series chain would not function with one processor bypassed. Accordingly, the use of bypass buses subdivided into rapidly switchable sections by clock-activated latches makes it possible to construct fault-tolerant processor chains without operating speed penalties.

A typical fault tolerant processor chain would incorporate for example five processors 90 in series for a computation requiring four. Any one faulty or unnecessary processor could then be bypassed. If greater fault tolerance were required, additional processors could be added. Prior art processors such as those described in Reference 1 cannot be arranged in this way for fault tolerance without operating speed penalties. This is because in the present invention data and results flow in the same direction down a processor such as 10 or a chain of processors 90. Bypass latches delay data and result streams equally, and there is no relative delay introduced therebetween. Bypassing a faulty processor therefore preserves the relative timing of data and result streams from a preceding processor in the chain to one succeeding. In Reference 1, processor designs are described in which data and results move in counterflow. In a chain of such devices a central processor would receive data from one adjacent processor and results from the other. If one of these adjacent processors were to be bypassed with latched buses, either the data stream or the result stream would be delayed at the central processor but not both. This would disrupt the timing of the computation leading to meaningless results. Consequently, high speed fault tolerant processor chains cannot be constructed using prior art counterflow architectures, whereas they can be constructed using processors of the invention arranged for unidirectional data and result flow. This is an important advantage of the invention. Integrated circuit technology is presently moving to wafer scale integration, in which high speed fault tolerant architectures are vital. Without some degree of fault tolerance wafer scale circuit yields can be virtually zero, since one faulty device on a wafer bearing hundreds may mean the entire wafer is inoperative.

Referring now to FIG. 10, in which parts equivalent to those shown in FIG. 2 are like referenced with the prefix 200, there is shown an alternative form of gated full adder logic cell 214 for use in a processor 10, 50 or 90. The cell 214 differs from cell 14 only in that it has two data output latches $218x_1$ and $218x_2$, and only one result output latch $218y$. The cell 214 is employed in a processor (not shown) with interconnections exactly as shown in FIG. 1 for cell 14. A processor incorporating logic cells 214 has results moving at twice the speed of data. Coefficient input to the processor is implemented in reverse order compared to that shown in FIGS. 4 to 6. Correlation coefficients $a_0$ to $a_3$ for example would be input to cells $14_{30}$ to $14_{00}$ respectively, instead of to cells $14_{00}$ to $14_{20}$ respectively as in FIG. 4. An analysis of processor operation similar to that previously given would demonstrate that this coefficient input scheme to a processor incorporating cells 214 also produces a correlation computation. This analysis will not be described since it is analogous to that given earlier. A minor difference occurs in changing between coefficient sets. Instead of the two clock cycle delay between coefficient changeover in adjacent rows shown in FIG. 4, only a one cycle delay is required. Arrays of processors 50 and 90 incorporating cells 214 require result accumulation timing adjustment compared to that described earlier, in order to compensate for slower data flow and faster result flow. This will not be described since the required adjustment will be apparent to those skilled in digital electronics.

The processor of the invention may be arranged for operation with two's complement data and/or coefficients. The embodiments previously described employed a four bit data stream. If this was in two's complement form, it would require the sign bit or most significant bit to be replicated until each input data word had the same width as output results. Six bit input data would accordingly be necessary. More specifically, a four bit data word in two's complement form having bits abcd would be expressed as aaabcd. The processor 10 does not accept a six bit input. Instead of the FIG. 1 4×4 gated full adder array plus five half adders, a 4×6 array of gated full adders is employed with interconnections as in FIG. 1. Such an array operates on four bit two's complement data sign bit extended to six bits analogously to the processor 10 on four bit all positive data. In general, the required array shape is rectangular with the number of cells per row equal to the bit width of the output result from last row cells.

Two's complement data may also be accommodated by multiple processors arranged together as described with reference to FIGS. 7, 8 and 9. Sign extension must be provided for in respect of results fed to an output adder equivalent to adder 54, and also for one byte input data or for the most significant byte of data subdivided into bytes for separate processing. In particular, results containing a sign bit passing to an output adder must be sign extended to the full width of the overall result—ie the result produced from the final output adder in a combination of processors.

Two's complement coefficients may also be employed in a processor of the invention. In the case of single bit coefficients, multiplication is by 0 or 1, the latter being negative. The result is accordingly entirely negative since the zeros do not provide a positive contribution. The computation is consequently equivalent to that for all positive coefficients. In the case of multibit coefficients, only the most significant processor contains negative coefficients and its result is wholly negative. The two's complement of this result is taken by known gating means and it is sign extended to the full width of the overall result before input to the final output adder.

The principles of digital arithmetic circuits for two's complement numbers are well known and these will not be described further.

Multiple processors analogous to processor 50 may also be employed with two's complement data, provided that they each incorporate a rectangular array of gated full adder cells with the number of cells per row equal to the bit width of the respective results. For input data divided into individual bytes for separate processing, the most significant bit of the output result of the processor receiving the most significant byte is sign extended to the full width of the overall result, ie the result output from the most significant output adder equivalent to adder 54 in FIG. 4.

Whereas the examples of the invention have been described in terms of correlation, they are also suitable for use in convolution. This is described in Reference 1 for example, and arises as follows. The convolution operation is defined by:

$$Y_n = \sum_{i=0}^{N-1} A_i X_{n-i} \text{ provided } i \leq n \quad (9)$$

The correlation operation is defined by:

$$Y_n = \sum_{i=0}^{N-1} A_i X_{n+i} \quad (10)$$

From Equation (9) the fifth convolution result $Y_4$ of four point computations (N=4) is given by:

$$Y_4 \text{ (convolution)} = A_0 X_4 + A_1 X_3 + A_2 X_2 + A_3 X_1 \quad (11)$$

From Equation (10), the second correlation result $Y_1$ of a four point computation is given by:

$$Y_1 \text{ (correlation)} = A_0 X_1 + A_1 X_2 + A_2 X_3 + A_3 X_4 \quad (12)$$

Rearranging Equation (12) with the right hand side in reverse order and writing $B_i = A_{3-i}$, i=0 to 3:

$$Y_1 \text{ (correlation)} = B_0 X_4 + B_1 X_3 + B_3 X_1 \quad (13)$$

Equations (11) and (13) are equivalent, demonstrating that convolution and correlation are equivalent mathematical operations. Convolution of data with a set of coefficients is equivalent to correlation of the same data with the same coefficients in reverse order. For a given set of coefficients $A_o$ to $A_k$, a convolution or correlation operation will be performed by a processor of the invention according to whether coefficient words are input beginning with $A_0$ to the top or bottom row. The reverse of this applies to a processor incorporating the FIG. 10 cell 214. There is a small difference in that the first few terms in a convolution result series are absent in the corresponding correlation series. Equation (10) for example cannot generate $Y_0$ to $Y_2$ of Equation (9). However, for practical purposes this is not important. Digital arithmetic circuits are employed to generate very large numbers of results, and a few extra or absent results at the beginning of a series of millions for example is insignificant.

We claim:

1. A bit-slice digital processor for executing correlation and convolution operations of N single bit coefficients with a bit parallel, word serial, bit staggered data stream of M bit words, where N and M are positive integers greater than unity, and wherein:
   (1) the processor includes an array of N rows and M columns of logic cells;
   (2) each logic cell is arranged to:
      (a) input a data bit, a carry bit and a cumulative sum bit,
      (b) output the data bit, and
      (c) produce an output cumulative sum bit and an output carry bit corresponding to addition of the input cumulative sum bit and input carry bit to a product arising from multiplication of the input data bit by a coefficient bit corresponding to a respective row of cells;
   (3) cell interconnection lines are arranged to provide for carry bit propagation along array rows and for data flow and cumulative sum generation to proceed unidirectionally down array columns; and
   (4) the cell interconnection lines include clock activated delaying means arranged to provide for data bits and cumulative sum bits to move down array columns at respective rates one of which is twice the other, and for carry bits to move along array rows at the rate of the faster of these in the direction of increasing data bit significance.

2. A processor according to claim 1 including additional cell interconnection lines and clock activated delaying means arranged to provide for coefficient bits to move along respective array rows at the rate and in the direction of carry bit movement.

3. A processor according to claim 1, wherein array columns have respective final cells, said final cells having cumulative sum outputs connected via respective programmable clock activated delaying means to respective first inputs of a programmable clock activated parallel adder arranged to add signals at said first inputs to signals at respective second inputs of said adder.

4. A processor according to claim 3 including bypass connections for input data and for said second adder inputs, the bypass connections being subdivided by clock-activated latches.

5. A processor according to claim 3, wherein the width of the parallel adder is sufficient to accommodate a relative difference in bit significance between signals applied to said first and second adder inputs respectively.

6. A processor according to claim 5, wherein the width of the parallel adder is sufficient to accommodate a relative difference in bit significance of M bits.

7. A processor according to claim 1 including $\log_2 n$ half adders extending the nth row of logic cells, where n is equal to 1 to N and $\log_2 n$ is rounded up to a whole number if necesssary.

8. A processor according to claim 1 including $\log_2(n-1)$ half adder cells extending the nth row of logic cells, and wherein each row has a respective final cell to which carry bits flow and the (n−1)th row has a final cell carry output connected via delaying means to a sum input of an appropriate nth row half adder, where n is equal to 2 to N and $\log_2(n-1)$ is rounded up to an integer if necessary.

* * * * *